(12) United States Patent
Tian et al.

(10) Patent No.: US 12,158,558 B1
(45) Date of Patent: Dec. 3, 2024

(54) REAL-TIME CALIBRATION METHOD AND SYSTEM OF ACOUSTIC LOGGING DATA WHILE DRILLING FOR PRECISE NAVIGATION OF DEEP OIL AND GAS

(71) Applicant: Institute of Geology and Geophysics, Chinese Academy of Sciences, Beijing (CN)

(72) Inventors: Fei Tian, Beijing (CN); Qingyun Di, Beijing (CN); Wenhao Zheng, Beijing (CN); Yongyou Yang, Beijing (CN); Wenjing Cao, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/608,628

(22) Filed: Mar. 18, 2024

(30) Foreign Application Priority Data

Oct. 18, 2023 (CN) .......................... 202311346509.7

(51) Int. Cl.
*G01V 13/00* (2006.01)
*G01V 1/50* (2006.01)

(52) U.S. Cl.
CPC ................ *G01V 13/00* (2013.01); *G01V 1/50* (2013.01)

(58) Field of Classification Search
CPC .................................. G01V 13/00; G01V 1/50
See application file for complete search history.

(56) References Cited

U.S. PATENT DOCUMENTS 11,740,372 B1 * 8/2023 Tian ....................... G01V 1/282
11,852,771 B1 * 12/2023 Tian ........................ G01V 1/48
2015/0085604 A1 * 3/2015 Flanagan ................ G01V 1/003
367/14
2016/0034818 A1 * 2/2016 Knecht ................... E21B 41/00
166/308.1
2020/0003922 A1 * 1/2020 Bennett ..................... G01V 1/48

FOREIGN PATENT DOCUMENTS

| CA | 3076280 A1 * | 4/2019 | ............ G01V 11/00 |
| CN | 101013161 A * | 8/2007 | |
| CN | 112211628 A * | 1/2021 | |
| CN | 116500679 A | 7/2023 | |
| CN | 116644284 A | 8/2023 | |
| JP | 2004125641 A * | 4/2004 | |

* cited by examiner

*Primary Examiner* — Catherine T. Rastovski
*Assistant Examiner* — Lal C Mang
(74) *Attorney, Agent, or Firm* — Nitin Kaushik

(57) ABSTRACT

The present invention belongs to the field of geologic survey, and particularly relates to a real-time calibration method and system of acoustic logging data while drilling for precise navigation of deep oil and gas, aiming to solve a problem of inability to automatically identify stratum boundaries to adapt to geology at various different depths in an existing drilling process. The method of the present invention includes: acquiring standardized acoustic parameter data while drilling; acquiring time-depth relationship of historical acoustic curve data of drilled wells, and current actual drilling time-depth relationship; performing interpolation based on the current actual drilling time-depth relationship, to acquire interpolated current actual drilling time-depth relationship; correcting the interpolated current actual drilling time-depth relationship; and completing current precise depth correction based on the current actual drilling acoustic curve.

6 Claims, 1 Drawing Sheet

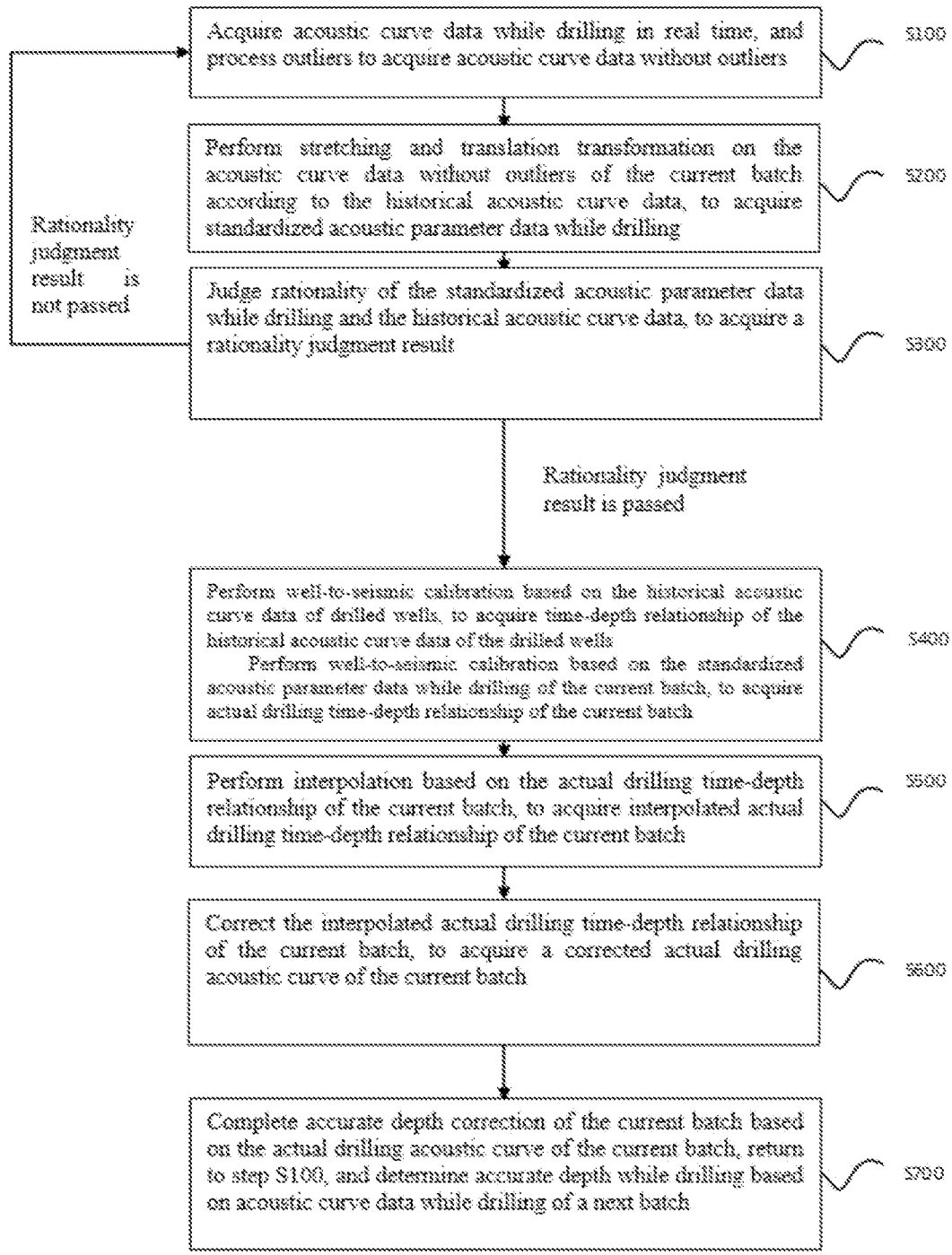

REAL-TIME CALIBRATION METHOD AND SYSTEM OF ACOUSTIC LOGGING DATA WHILE DRILLING FOR PRECISE NAVIGATION OF DEEP OIL AND GAS

CROSS-REFERENCE TO RELATED APPLICATIONS

The application claims priority to Chinese patent application No. 2023113465097, filed on Oct. 18, 2023, the entire contents of which are incorporated herein by reference.

TECHNICAL FIELD

The present invention belongs to the field of geologic survey, and particularly to a real-time calibration method and system of acoustic logging data while drilling for precise navigation of deep oil and gas.

BACKGROUND

A deep precise navigation technology can be used for deep oil and gas exploration, and guiding drilling personnel to optimize a well trajectory to a designated location of an oil and gas reservoir to acquire the maximum well drainage area and the best recovery ratio, and becomes a cutting-edge technology to improve oil and gas production per well and oilfield development benefits. In the process of real-time drilling, non-stratum factors, such as instruments and mud drilling fluid, have a significant impact on logging curves, which interferes with the subsequent work of stratigraphic lithology inversion. Therefore, a tuning algorithm suitable for logging data while drilling is needed to eliminate dimensional differences in logging curves of different wells, noise effects of the non-stratum factors, and measurement depth errors, so as to improve accuracy and efficiency of a reservoir prediction model while drilling.

As an important technology leading the field of deep oil and gas exploration, the deep precise navigation technology is rapidly becoming a key transformative factor. The present world is facing increasing severe energy challenges, and there is an urgent need to improve efficiency and production of oilfield development. In this urgent situation, the importance of the deep precise navigation technology cannot be ignored.

During oil and gas exploration, optimizing the well trajectory of drilling is crucial as it directly affects the development benefits of the oil and gas reservoir. By providing high-precise positioning capabilities, the deep precise navigation technology enables the drilling personnel to direct a rockshaft precisely to a specific location of the oil and gas reservoir to acquire the maximum well drainage area and the optimum recovery ratio. The application of the technology can not only significantly increase the oil and gas output of a single well, but also has the potential to achieve great economic benefits in the entire oilfield development.

However, the deep precise navigation technology faces severe challenges in a real-time drilling process. The impact caused by non-stratum factors such as instrument errors, mud drilling fluid, etc. often generates significant interference to logging curves, making it difficult to interpret and predict stratum lithology. This means that we must urgently develop a tuning algorithm that adapts to logging data while drilling to address these challenges.

The tuning algorithm needs to solve multiple key problems. Firstly, the tuning algorithm must be capable of eliminating dimensional differences between logging curves of different wells, so that data can be reliably compared and analyzed. Secondly, the algorithm must also have ability to reduce noise, effectively remove interference introduced by the non-stratum factors, and improve accuracy of stratum characteristic interpretation. In addition, precise measurement of depth information is crucial for construction of a reservoir prediction model while drilling, and therefore, precision of a depth correction method cannot be ignored.

By applying the urgently developed tuning algorithm, we will be capable of significantly improving accuracy and efficiency of the reservoir prediction model while drilling. This will provide decision-makers and technical researchers with more reliable data support, helping them better understand characteristics and distribution laws of oil and gas reservoirs, thereby optimizing drilling plans, increasing oil and gas production, and addressing urgent energy challenges. Importance of the deep precise navigation technology cannot be ignored, as it will lead oil and gas exploration industry towards more efficient and sustainable development.

SUMMARY

In order to solve problems mentioned above in the prior art, namely inability to automatically identify stratum boundaries to adapt to various geological depths in an existing drilling process, the present invention provides a real-time calibration method of acoustic logging data while drilling for precise navigation of deep oil and gas. The method includes:

step S100, acquiring acoustic curve data while drilling in real time, processing outliers to acquire acoustic curve data without outliers, where the acoustic curve data while drilling is acquired in a batch form, and acquiring historical acoustic curve data of drilled wells;

step S200, performing stretching and translation transformation on the acoustic curve data without outliers of a current batch according to the historical acoustic curve data, to acquire standardized acoustic parameter data while drilling;

step S300, judging rationality of the standardized acoustic parameter data while drilling and the historical acoustic curve data, to acquire a rationality judgment result, if the rationality judgment result is accepted, proceeding to step S400, if the rationality judgment result is not accepted, proceeding to step S100, adjusting determination conditions for processing the outliers, and re-judging the rationality;

step S400, performing well-to-seismic calibration based on the historical acoustic curve data of the drilled wells, to acquire time-depth relationship $[[TT_1, DD_1][TT_2, DD_2] \ldots [TT_y, DD_y]]$ of the historical acoustic curve data of the drilled wells, and performing well-to-seismic calibration based on the standardized acoustic parameter data while drilling of the current batch, to acquire actual drilling time-depth relationship $[[T_1, D_1][T_2, D_2] \ldots [T_x, D_x]]$ of the current batch;

step S500, performing interpolation based on the actual drilling time-depth relationship of the current batch, to acquire interpolated actual drilling time-depth relationship $[[T'_1, D'_1][T'_2, D'_2] \ldots [T'_w, D'_w]]$ of the current batch;

step S600, correcting the interpolated actual drilling time-depth relationship $[[T'_1, D'_1][T'_2, D'_2] \ldots [T'_w, D'_w]]$ of the current batch, to acquire a corrected actual drilling acoustic curve of the current batch; and step S700, completing precise depth correction of the current batch based on the actual drilling acoustic curve of the current batch, returning to step S100, and determining precise depth while drilling based on acoustic curve data while drilling of a next batch.

In some preferred implementations, the outliers are processed by an isolation forest method, including:

step S110, using the acoustic curve data while drilling as a dataset X to be processed;

step S120, randomly extracting φ data points from the dataset X to be processed to form a data subset X' to be processed, and storing the data subset to be processed in a root node;

step S130, randomly selecting a dimension q from the dataset X to be processed, and randomly generating a split point p in the dimension q, where the split point p satisfies min $(x_{ij}, j=q, x_{ij} \in X') < p < $ max $(x_{ij}, j=q, x_{ij} \in X')$, and i represents a serial number;

step S140, generating, based on a split point p, a hyperplane that divides data in the dimension q into two subspaces, and placing data points with values smaller than p in the dimension q into the first leaf node, and data points with values greater than or equal to p into the second leaf node;

step S150, performing recursion on the methods described in steps S130 to S140 until all the leaf nodes have only one data point or isolation trees have reached a preset height;

step S160, repeating the methods described in steps S130 to S150 until T isolation trees are generated, where the T isolation trees represent: the isolation trees have no external node of a leaf node, or have two leaf nodes $\{T_l, T_r\}$ and one internal node test; the internal node test of the T isolation trees consists of the dimension q and a split point p, the points with q<p belong to $T_l$, and otherwise, the points belong to $T_r$;

step S170, calling the T isolation trees as an isolation tree forest, letting each data point $x_i$ traverse through each isolation tree, and calculating heights $h(x_i)$ of the data points $x_i$ in each isolation tree, namely the number of edges that the data points $x_i$ pass through from the root node to the leaf nodes of the isolation tree where the data points locate; and thus, calculating an average height of the data points $x_i$ in the isolation tree forest, and normalizing the average heights of all the data points to acquire a normalized average height $\overline{h(x_1)}$ of the data points; and step S180, calculating an outlier score $s(x,\varphi)$ based on the normalized average height $\overline{h(x_1)}$ of the data points:

$$s(x, \varphi) = 2^{\frac{E(\overline{h(x_1)})}{\overline{c(\varphi)}}},$$

where
$\overline{c(\varphi)}$ represents an average value of the binary tree path lengths constructed by φ data points, and $E(*)$ represents an expectation;

$$\overline{c(\varphi)} = \begin{cases} 2H(\varphi-1) - \frac{2(\varphi-1)}{\varphi}, & \varphi > 2 \\ 1, & \varphi = 2 \\ 0, & \varphi < 2; \end{cases}$$

H(i) represents a harmonic number, and is estimated through ln(i)+0.5772156649, and 0.5772156649 is Euler's constant; and when the outlier score $s(x,\varphi)$ is less than a preset outlier threshold S, removing the corresponding data points to acquire the acoustic curve data $C=\{c_1, \ldots, c_\alpha, \ldots, c_m\}$, $1 \leq \alpha \leq m$, and $c_\alpha \in C$ without outliers, where m represents the number of the data points in the seismic data without outliers.

In some preferred implementations, step S200 specifically includes:

step S210, calculating a mean estimated value $AC_{mean}$ and a variance estimated value $AC_{var}$ of the acoustic curve data without outliers of the current batch:

$$AC_{mean} = \frac{\sum_{i=1}^{i=Card(batch)} AC_i}{Card(batch)},$$

$$AC_{var} = \sqrt{\frac{1}{Card(batch)} \sum_{j=1}^{N} (AC - AC_{mean})^2};$$

Card(batch) represents the number of samples in a batch, j represents the serial number of counting operators, i represents the serial number of the samples, and the meaning of N is the same as meaning of Card(batch);

step S220, calculating a standard deviation $\sigma_s$ of historical AC curve data, and performing stretching and compression transformation on AC curve data without outliers of the current batch;

$$stretch_k = AC_{mean} + (AC_k - AC_{mean}) * \frac{\sigma_s}{AC_{var}},$$

where
$stretch_k$ represents the AC data acquired after stretching and compression transformation, and $AC_k$ represents an AC value of the $k^{th}$ sample point of the AC curve data without outliers of the current batch; and step S230, performing translation transformation on the AC data acquired after the stretching and compression transformation based on a mean standard value $\mu_s$ of the historical AC curve data:

offset$_y$=stretch$_k$+($\mu_s$−$AC_{mean}$), where offset$_y$ represents the standardized acoustic parameter data while drilling acquired after the translation transformation.

In some preferred implementations, step S300 specifically includes:

step S310, calculating a probability distribution curve $L_1$ of the transformed AC parameter data while drilling and a probability distribution curve $L_2$ of AC parameter data of drilled wells, separately;

step S320, calculating a probability distribution curve area intersection $U_1$ and a probability distribution curve area union $U_2$ based on $L_1$ and $L_2$;

step S330, calculating a quality control parameter $U=U_1/U_2$ based on $U_1$ and $U_2$; and step S340, comparing a size of the quality control parameter U with that of a set quality control threshold;

when the quality control parameter U is greater than or equal to the set quality control threshold, determining that the rationality judgment result is accepted, and proceeding to step S400; and when the quality control parameter U is less than the set quality control threshold, determining that the rationality judgment result is not accepted, proceeding to step S100, and adjusting an outlier threshold S.

In some preferred implementations, a method for well-to-seismic calibration includes:

acquiring a wave impedance curve by multiplying an acoustic time difference curve by a density curve in logging data of each known well location, and then calculating a reflection coefficient curve;

constructing a ricker wavelet based on dominant frequency of seism in a target section, and performing convolution computation on the ricker wavelet and the reflection coefficient curve to acquire a synthetic seismogram; and enabling depth data of a marker bed at a borehole of each drilling well location to correspond to isochronous three-dimensional distribution of the marker bed, calculating correlation between the synthetic seismogram and the spread spectrum simulated wavelet of a near-well seismic trace, when waveform correlation is higher than a preset relevant threshold, completing the well-to-seismic calibration, and acquiring time-depth conversion relationship between logging depth and two-way travel time of seismic reflection waves:

$$T_d = T_{H_0} + 2 \sum_{i_{between}=1}^{Z_{between}} Ti_{between} \Delta H;$$

where $T_{H_0}$ represents two-way travel time of seismic data corresponding to depth of an acoustic logging marker bed; $Ti_{between}$ represents an acoustic time difference; $\Delta H$ represents a sampling interval for logging curve data; and $T_d$ represents the two-way travel time of seismic waves.

In some preferred implementations, step S500 specifically includes:

performing spline interpolation on the actual drilling time-depth relationship $[[T_1, D_1][T_2, D_2] \ldots [T_x, D_x]]$ of the current batch and the time-depth relationship $[[TT_1, DD_1][TT_2, DD_2] \ldots [TT_y, DD_y]]$ of the historical acoustic curve data of the drilled wells according to time, to acquire interpolated actual drilling time-depth relationship $[[T'_1, D'_1][T'_2, D'_2] \ldots [T'_w, D'_w]]$ of the current batch and the interpolated time-depth relationship $[[TT'_1, DD'_1][TT'_2, DD'_2] \ldots [TT'_w, DD'_w]]$ of the historical acoustic curve data of the drilled wells that are consistent, where $[T'_1, T'_2, \ldots T'_w]$ and $[TT'_1, TT'_2, \ldots TT'_w]$ are consistent.

In some preferred implementations, step S600 specifically includes:

step S610, correcting a depth value in the actual drilling time-depth relationship $[[T_1, D_1][T_2, D_2] \ldots [T_x, D_x]]$ of the current batch based on the time-depth relationship $[[TT_1, DD_1][TT_2, DD_2] \ldots [TT_y, DD_y]]$ of the historical acoustic curve data of the drilled wells, to acquire corrected actual drilling time-depth relationship of the current batch; and step S620, querying acoustic time difference data $[[D_1, AC_1][D_2, AC_2] \ldots [D_x, AC_x]]$ based on the corrected depth value in the actual drilling time-depth relationship of the current batch, to acquire accurate acoustic curve data of the current batch.

On the other hand, the present invention provides a real-time calibration system of acoustic logging data while drilling for precise navigation of deep oil and gas, and the system includes:

a data acquisition and outlier processing module, configured to acquire acoustic curve data while drilling in real time, process outliers to acquire acoustic curve data without outliers, where the acoustic curve data while drilling is acquired in a batch form, and acquire historical acoustic curve data of drilled wells;

a data standardization module, configured to perform stretching and translation transformation on the acoustic curve data without outliers of a current batch according to the historical acoustic curve data, to acquire standardized acoustic parameter data while drilling;

a rationality judgment module, configured to judge rationality of the standardized acoustic parameter data while drilling and the historical acoustic curve data, to acquire a rationality judgment result, if the rationality judgment result is accepted, proceed to a well-to-seismic calibration module, and if the rationality judgment result is not accepted, proceed to the data acquisition and outlier processing module, adjust determination conditions for processing the outliers, and re-judge the rationality;

the well-to-seismic calibration module, configured to perform well-to-seismic calibration based on the historical acoustic curve data of the drilled wells, to acquire time-depth relationship $[[TT_1, DD_1][TT_2, DD_2] \ldots [TT_y, DD_y]]$ of the historical acoustic curve data of the drilled wells, and performing well-to-seismic calibration based on the standardized acoustic parameter data while drilling of the current batch, to acquire actual drilling time-depth relationship $[[T_1, D_1][T_2, D_2] \ldots [T_x, D_x]]$ of the current batch;

an interpolation module, configured to perform interpolation based on the actual drilling time-depth relationship of the current batch, to acquire interpolated actual drilling time-depth relationship $[[T'_1, D'_1][T'_2, D'_2] \ldots [T'_w, D'_w]]$ of the current batch;

a time-depth relationship correcting module, configured to correct the time-depth relationship $[[TT_1, DD_1][TT_2, DD_2] \ldots [TT_y, DD_y]]$ of the historical acoustic curve data of the drilled wells based on the interpolated actual drilling time-depth relationship $[[T'_1, D'_1][T'_2, D'_2] \ldots [T'_w, D'_w]]$ of the current batch, to acquire a corrected actual drilling acoustic curve of the current batch; and a precise depth calculation module, configured to complete accurate depth correction of the current batch based on the actual drilling acoustic curve of the current batch, return to the data acquisition and outlier processing module, and determine the precise depth while drilling based on the acoustic curve data while drilling of a next batch.

The present invention has the following beneficial effects:

(1) The stratum boundaries are automatically identified through logging curves while drilling uploaded in real time, and an acoustic curve while drilling is adaptively optimized, so that accuracy of the acoustic curve while drilling acquired finally is improved, and applicability of predicted values of the acoustic curve while drilling at different depths is enhanced.

(2) Quality control is performed by using a coverage area ratio of normal probability distribution, and accuracy of outlier removal can be improved, that is, interference factors are removed while correct information is retained.

(3) In the present invention, time-depth conversion of actual drilling data is acquired through well-to-seismic calibration based on the synthetic seismogram calculated from the acoustic time difference curve, measurement depth of the acoustic time difference curve while drilling is corrected by using existing time-depth relationship in a work area, and accuracy of the acoustic curve while drilling is improved.

BRIEF DESCRIPTION OF DRAWINGS

By reading detailed description of non-limiting embodiments made with reference to the following drawings, other features, objectives, and advantages of the present application will become more apparent:

FIG. 1 is a schematic flowchart of a real-time calibration method of acoustic logging data while drilling for precise navigation of deep oil and gas according to embodiments of the present invention.

DETAILED DESCRIPTION OF THE EMBODIMENTS

The present application will be further described in detail below in conjunction with accompanying drawings and embodiments. It should be understood that the specific embodiments described herein are merely intended to explain related invention, rather than to limit the present invention. It should also be noted that, for convenience of description, only the parts related to relevant invention are shown in the accompany drawings.

It should be noted that, without conflict, the embodiments in the present application and the features in the embodiments can be combined with each other. The present application will be described in detail below with reference to the accompanying drawings and the embodiments.

In order to provide a clearer explanation of a real-time calibration method of acoustic logging data while drilling for accurate navigation of deep oil and gas of the present invention, the following will elaborate on each step in the embodiments of the present invention in conjunction with FIG. 1.

The real-time calibration method of acoustic logging data while drilling for precise navigation of deep oil and gas in a first embodiment of the present invention includes step S100 to step S600, and each step is described in detail as follows:

In the prior art, an acoustic logging curve while drilling is uploaded in real time in a drilling process, and abnormal points may occur due to instruments and rockshaft stratum environment factors; there are dimensional differences between measured data and measured curve data of drilled wells, due to differences in stratums, instruments while drilling, and cable logging standards; and in measurement while drilling, due to differences in stratum lithology, drilling speed changes accordingly, resulting in significant changes in a sampling rate of a measured curve while drilling, and measured well depth is also affected accordingly.

Step S100, acoustic curve data while drilling is acquired in real time, outliers are processed to acquire acoustic curve data without outliers, where the acoustic curve data while drilling is acquired in a batch form. To ensure real-time performance of data processing, since an acoustic logging curve cannot directly reflect the stratum lithology, the stratum stratification is acquired by using variance calculation of an AC curve while drilling, and therefore in this step, batch is acquired according to the stratum thickness. Latest data is gradually selected for processing in a batch form, ensuring real-time performance of a generated model to adapt to geological changes at different depths.

In the embodiment, based on actual stratum conditions of a target location, the number m of data points on a logging curve within a batch is preset, and initialization is performed: n is set to be n=0;

in the drilling process, for each sample point measured, n=n+1;

when n is equal to m, current n sample points acquired are considered as a batch;

n is reset to be n=0; and data is output according to the batch in the drilling process.

In the embodiment, the outliers are processed by an isolation forest method, including:

step S110, using the acoustic curve data while drilling as a dataset X to be processed;

step S120, randomly extracting φ data points from the dataset X to be processed to form a data subset X' to be processed, and storing the data subset to be processed in a root node;

step S130, randomly selecting a dimension q from the dataset X to be processed, and randomly generating a split point p in the dimension q, where the split point p satisfies $\min(x_{ij}, j=q, x_{ij} \in X') < p < \max(x_{ij}, j=q, x_{ij} \in X')$, and i represents a serial number;

step S140, generating, based on a split point p, a hyper plane that divides data in the dimension q into two subspaces, and placing data points with values smaller than p in the dimension q into the first leaf node, and data points with values greater than or equal to p into the second leaf node;

step S150, performing recursion on the methods described in steps S130 to S140 until all the leaf nodes have only one data point or isolation trees have reached a preset height;

step S160, repeating the methods described in steps S130 to S150 until T isolation trees are generated, where the T isolation trees represent: the isolation trees have no external node of a leaf node, or have two leaf nodes $\{T_l, T_r\}$ and one internal node test; the internal node test of the T isolation trees consists of the dimension q and a split point p, the points with q<p belong to $T_l$, and otherwise, the points belong to $T_r$;

step S170, calling the T isolation trees as an isolation tree forest, letting each data point $x_i$ traverse through each isolation tree, and calculating heights $h(x_i)$ of the data points $x_i$ in each isolation tree, namely the number of edges that the data points $x_i$ pass through from the root node to the leaf nodes of the isolation tree where the data points locate; and thus, calculating an average height of the data points $x_i$ in the isolation tree forest, and normalizing the average heights of all the data points to acquire a normalized average height $\overline{h(x_i)}$ of the data points; and step S180, calculating an outlier score $s(x,\varphi)$ based on the normalized average height $\overline{h(x_i)}$ of the data points:

$$s(x, \varphi) = 2^{\frac{E(\overline{h(x_i)})}{c(\varphi)}},$$

where
$\overline{c(\varphi)}$ represents an average value of the binary tree path lengths constructed by φ data points, and E(*) represents an expectation;

$$\overline{c(\varphi)} = \begin{cases} 2H(\varphi-1) - \frac{2(\varphi-1)}{\varphi}, & \varphi > 2 \\ 1, & \varphi = 2 \\ 0, & \varphi < 2 \end{cases};$$

H(i) represents a harmonic number, and is estimated through ln(i)+0.5772156649, and 0.5772156649 is Eule's constant; and when the outlier score s(x,φ) is less than a preset outlier threshold S, removing the corresponding data points to acquire the acoustic curve data $C=\{c_1, \ldots, c_\alpha, \ldots, c_m\}$, $1 \le \alpha \le m$, and $c_\alpha \in C$ without outliers, where m represents the number of the data points in the seismic data without outliers. Historical acoustic curve data of the drilled wells is acquired.

step S200, performing stretching and translation transformation on the acoustic curve data without outliers of a current batch according to the historical acoustic curve data, to acquire standardized acoustic parameter data while drilling;

In the embodiment, step S200 specifically includes:

step S210, calculating a mean estimated value $AC_{mean}$ and a variance estimated value $AC_{var}$ of the acoustic curve data without outliers of the current batch:

$$AC_{mean} = \frac{\sum_{i=1}^{i=Card(batch)} AC_i}{Card(batch)},$$

$$AC_{var} = \sqrt{\frac{1}{Card(batch)} \sum_{j=1}^{N} (AC - AC_{mean})^2};$$

Card(batch) represents the number of samples in a batch, j represents the serial number of counting operators, i represents the serial number of the samples, and the meaning of N is of the same as meaning of Card(batch);

step S220, calculating a standard deviation $\sigma_s$ of historical AC curve data, and performing stretching and compression transformation on AC curve data without outliers of the current batch;

$$stretch_k = AC_{mean} + (AC_k - AC_{mean}) * \frac{\sigma_s}{AC_{var}},$$

$stretch_k$ represents the AC data acquired after stretching and compression transformation, and $AC_k$ represents an AC value of the $k^{th}$ sample point of the AC curve data without outliers of the current batch; and step S230, performing translation transformation on the AC data acquired after the stretching and compression transformation based on a mean standard value fs of the historical AC curve data:

$offset_v = stretch_k + (\mu_s - AC_{mean})$, where $offset_v$ represents the standardized acoustic parameter data while drilling acquired after the translation transformation.

step S300, judging rationality of the standardized acoustic parameter data while drilling and the historical acoustic curve data, to acquire a rationality judgment result, if the rationality judgment result is accepted, proceeding to step S400, if the rationality judgment result is not accepted, proceeding to step S100, adjusting determination conditions for processing the outliers, and rejudging the rationality;

step S400, performing well-to-seismic calibration based on the historical acoustic curve data of the drilled wells, to acquire time-depth relationship $[[TT_1, DD_1][TT_2, DD_2] \ldots [TT_y, DD_y]]$ of the historical acoustic curve data of the drilled wells, and In the embodiment, a method for well-to-seismic calibration includes:

acquiring a wave impedance curve by multiplying an acoustic time difference curve by a density curve in logging data of each known well location, and then calculating a reflection coefficient curve;

constructing a ricker wavelet based on dominant frequency of seism in a target section, and performing convolution computation on the ricker wavelet and the reflection coefficient curve to acquire a synthetic seismogram; and enabling depth data of a marker bed at a borehole of each drilling well location to correspond to isochronous three-dimensional distribution of the marker bed, calculating correlation between the synthetic seismogram and the spread spectrum simulated wavelet of a near-well seismic trace, when waveform correlation is higher than a preset relevant threshold, completing the well-to-seismic calibration, and acquiring time-depth conversion relationship between logging depth and two-way travel time of seismic reflection waves:

$$T_d = T_{H_0} + 2 \sum_{i_{between}=1}^{Z_{between}} Ti_{between} \cdot \Delta H;$$

where $T_{H_0}$ represents two-way travel time of seismic data corresponding to depth of an acoustic logging marker bed; $Ti_{between}$ represents an acoustic time difference; ΔH represents a sampling interval for logging curve data; and $T_d$ represents the two-way travel time of seismic waves.

Well-to-seismic calibration is performed based on the standardized acoustic parameter data while drilling of the current batch, to acquire actual drilling time-depth relationship $[[T_1, D_1][T_2, D_2] \ldots [T_x, D_x]]$ of the current batch.

In the embodiment, step S300 specifically includes:

step S310, calculating a probability distribution curve $L_1$ of the transformed AC parameter data while drilling and a probability distribution curve $L_2$ of AC parameter data of drilled wells, separately;

step S320, calculating a probability distribution curve area intersection $U_1$ and a probability distribution curve area union $U_2$ based on $L_1$ and $L_2$;

step S330, calculating a quality control parameter $U=U_1/U_2$ based on $U_1$ and $U_2$; and step S340, comparing a size of the quality control parameter U with that of a set quality control threshold;

when the quality control parameter U is greater than or equal to the set quality control threshold, determining that the rationality judgment result is accepted, and proceeding to step S400; and when the quality control parameter U is less than the set quality control threshold, determining that the rationality judgment result is not accepted, proceeding to step S100, and adjusting an outlier threshold S.

step S500, performing interpolation based on the actual drilling time-depth relationship of the current batch, to acquire interpolated actual drilling time-depth relationship $[[T'_1, D'_1][T'_2, D'_2] \ldots [T'_w, D'_w]]$ of the current batch;

In the embodiment, step S500 specifically includes:

performing spline interpolation on the actual drilling time-depth relationship $[[T_1, D_1][T_2, D_2] \ldots [T_x, D_x]]$ of the current batch and the time-depth relationship $[[TT_1, DD_1][TT_2, DD_2] \ldots [TT_y, DD_y]]$ of the historical acoustic curve data of the drilled wells according to time, to acquire interpolated actual drilling time-depth relationship $[[T'_1, D'_1][T'_2, D'_2] \ldots [T'_w, D'_w]]$ of the current batch and the interpolated time-depth relationship $[[TT'_1, DD'_1][TT'_2, DD'_2] \ldots [TT'_w, DD'_w]]$ of the historical acoustic curve data of the drilled wells that are consistent, where $[T'_1, T'_3, \ldots T'_w]$ and $[TT'_1, TT'_2, \ldots TT'_w]$ are consistent.

step S600, correcting the interpolated actual drilling time-depth relationship $[[T'_1, D'_1][T'_2, D'_2] \ldots [T'_w, D'_w]]$ of the current batch, to acquire a corrected actual drilling acoustic curve of the current batch; and In the embodiment, step S600 specifically includes:

step S610, correcting a depth value in the actual drilling time-depth relationship $[T_1, D_1][T_2, D_2] \ldots [T_x, D_x]]$ of the current batch based on the time-depth relationship $[[TT_1, DD_1][TT_2, DD_2] \ldots [TT_y, DD_y]]$ of the historical acoustic curve data of the drilled wells, to acquire corrected actual drilling time-depth relationship of the current batch; and step S620, querying acoustic time difference data $[[D_1, AC_1][D_2, AC_2] \ldots [D_x, AC_x]]$ based on the corrected depth value in the actual drilling time-depth relationship of the current batch, to acquire accurate acoustic curve data of the current batch.

Step S700, precise depth correction of the current batch is completed based on the actual drilling acoustic curve of the current batch, return to step S100, and accurate depth while drilling is determined based on acoustic curve data while drilling of a next batch.

Although steps in the above embodiments are described in sequence described above, those skilled in the art can understand that in order to achieve effects of the embodiments, different steps do not need to be executed in this order but can be executed simultaneously (in parallel) or in a reverse order. These simple changes are within the scope of protection of the present invention.

In a second embodiment of the present invention, a real-time calibration system of acoustic logging data while drilling for precise navigation of deep oil and gas is provided, including:

a data acquisition and outlier processing module, configured to acquire acoustic curve data while drilling in real time, process outliers to acquire acoustic curve data without outliers, where the acoustic curve data while drilling is acquired in a batch form, and acquire historical acoustic curve data of drilled wells;

a data standardization module, configured to perform stretching and translation transformation on the acoustic curve data without outliers of a current batch according to the historical acoustic curve data, to acquire standardized acoustic parameter data while drilling;

a rationality judgment module, configured to judge rationality of the standardized acoustic parameter data while drilling and the historical acoustic curve data, to acquire a rationality judgment result, if the rationality judgment result is accepted, proceed to a well-to-seismic calibration module, and if the rationality judgment result is not accepted, proceed to the data acquisition and outlier processing module, adjust determination conditions for processing the outliers, and re-judge the rationality;

the well-to-seismic calibration module, configured to perform well-to-seismic calibration based on the historical acoustic curve data of the drilled wells, to acquire time-depth relationship $[[TT_1, DD_1][TT_2, DD_2] \ldots [TT_y, DD_y]]$ of the historical acoustic curve data of the drilled wells; and well-to-seismic calibration is performed based on the standardized acoustic parameter data while drilling of the current batch, to acquire actual drilling time-depth relationship $[[T_1, D_1][T_2, D_2] \ldots [T_x, D_x]]$ of the current batch.

an interpolation module, configured to perform interpolation based on the actual drilling time-depth relationship of the current batch, to acquire interpolated actual drilling time-depth relationship $[[T'_1, D'_1][T'_2, D'_2] \ldots [T'_w, D'_w]]$ of the current batch;

a time-depth relationship correcting module, configured to correct the time-depth relationship $[[TT_1, DD_1][TT_2, DD_2] \ldots [TT_y, DD_y]]$ of the historical acoustic curve data of the drilled wells based on the interpolated actual drilling time-depth relationship $[[T'_1, D'_1][T'_2, D'_2] \ldots [T'_w, D'_w]]$ of the current batch, to acquire a corrected actual drilling acoustic curve of the current batch; and a precise depth calculation module, configured to complete accurate depth correction of the current batch based on the actual drilling acoustic curve of the current batch, return to the data acquisition and outlier processing module, and determine the precise depth while drilling based on the acoustic curve data while drilling of a next batch.

Those skilled in the technical art can clearly understand that, for convenience and brevity of description, reference can be made to corresponding processes in the foregoing method embodiments for specific working processes and relevant explanation of the above-described systems. Details are not described herein again.

It should be noted that the real-time calibration system of acoustic logging data while drilling for precise navigation of deep oil and gas provided by the above embodiments is only described by division of various functional modules mentioned above. In practice application, the functions can be completed by distributing to different functional modules as needed, that is, the modules or the steps in the embodiments of the present invention are re-divided or combined, for example, the modules in the above embodiments can be merged into one module or further split into multiple sub-modules to complete all or part of the functions described above. Names of the modules and the steps involved in the embodiments of the present invention are only for the purpose of distinguishing each module or step, and are not considered as inappropriate limitations to the present invention.

Those skilled in the technical art can clearly understand that, for convenience and brevity of description, reference can be made to corresponding processes in the foregoing method embodiments for specific working processes and relevant explanation of the above-described storing apparatuses and processing apparatuses. Details are not described herein again.

Those skilled in the art should be aware that the modules, methods and steps in examples described in combination with the embodiments disclosed herein can be implemented in electronic hardware, computer software, or a combination of the two. Programs corresponding to software modules, the methods and the steps may be placed in random access memory (RAM), memory, read-only memory (ROM), electrically programmable ROM, electrically erasable programmable ROM, registers, hard disks, removable disks, CD-ROMs, or any other form of storage medium known in the technical field. In order to clearly illustrate interchangeability of electronic hardware and software, composition and steps of each example have been described in general terms of functionality in the above description. Whether these functions are implemented in electronic hardware or software depends on specific applications of the technical solutions and design constraints. Those skilled in the art may use different methods to implement the described functions for each specific application, but such implementation should not be considered to be beyond the scope of the present invention.

Terms "first", "second", and so on are intended to distinguish between similar objects but do not describe or indicate a specific order or sequence.

A term "include", or any other similar terms are intended to cover non-exclusive including, so that a process, a method, an article, or a device/apparatus including a series of elements not only includes those elements, but also includes other elements that are not explicitly listed, or also includes inherent elements of the process, the method, the article, or the device/apparatus.

Thus, the technical solution of the present invention has been described in conjunction with the preferred embodiments as shown in the drawings. However, it is easy for those skilled in the art to understand that the scope of protection of the present invention is clearly not limited to these specific embodiments. On the premise of not deviating from the principles of the present invention, those skilled in the art may make equivalent changes or replacements to the relevant technical features, and the technical solutions after these changes or replacements will fall within the scope of protection of the present invention.

What is claimed is:

1. A real-time calibration method of acoustic logging data while drilling, to identify stratum boundaries and optimizing drilling at different depths for precise navigation of deep oil and gas, comprising:

step S100, acquiring acoustic curve data while drilling in real time, processing outliers to acquire acoustic curve data without outliers, wherein the acoustic curve data while drilling is acquired in a batch form, and acquiring historical acoustic curve data of drilled wells;

step S200, performing stretching and translation transformation on the acoustic curve data without outliers of a current batch according to the historical acoustic curve data, to acquire standardized acoustic parameter data while drilling;

step S300, judging rationality of the standardized acoustic parameter data while drilling and the historical acoustic curve data, to acquire a rationality judgment result, if the rationality judgment result is accepted, proceeding to step S400, if the rationality judgment result is not accepted, proceeding to step S100, adjusting determination conditions for processing the outliers, and re-judging the rationality, wherein the step S300 comprises:

step S310, calculating a probability distribution curve $L_1$ of the transformed AC parameter data while drilling and a probability distribution curve $L_2$ of AC parameter data of drilled wells, separately;

step S320, calculating a probability distribution curve area intersection $U_1$ and a probability distribution curve area union $U_2$ based on $L_1$ and $L_2$;

step S330, calculating a quality control parameter $U=U_1/U_2$ based on $U_1$ and $U_2$; and step S340, comparing a size of the quality control parameter U with that of a set quality control threshold;

when the quality control parameter U is greater than or equal to the set quality control threshold, determining that the rationality judgment result is accepted, and proceeding to step S400; and when the quality control parameter U is less than the set quality control threshold, determining that the rationality judgment result is not accepted, proceeding to step S100, and adjusting an outlier threshold S;

step S400, performing well-to-seismic calibration based on the historical acoustic curve data of the drilled wells, to acquire time-depth relationship $[TT_1,DD_1]$, $[TT_2, DD_2]$ ... $[TT_y, DD_y]]$ of the historical acoustic curve data of the drilled wells;

well-to-seismic calibration is performed based on the standardized acoustic parameter data while drilling of the current batch, to acquire actual drilling time-depth relationship $[[T_1, D_1][T_2, D_2] ... [T_x, D_x]]$ of the current batch;

a method for well-to-seismic calibration comprises:

acquiring a wave impedance curve by multiplying an acoustic time difference curve by a density curve in logging data of each known well location, and then calculating a reflection coefficient curve;

constructing a ricker wavelet based on dominant frequency of seism in a target section, and performing convolution computation on the ricker wavelet and the reflection coefficient curve to acquire a synthetic seismogram; and enabling depth data of a marker bed at a borehole of each drilling well location to correspond to isochronous three-dimensional distribution of the marker bed, calculating correlation between the synthetic seismogram and the spread spectrum simulated wavelet of a near-well seismic trace, when waveform correlation is higher than a preset relevant threshold, completing the well-to-seismic calibration, and acquiring time-depth conversion relationship between logging depth and two-way travel time of seismic reflection waves:

$$T_d = T_{H_0} + 2 \sum_{i_{between}=1}^{Z_{between}} Ti_{between} \cdot \Delta H;$$

wherein $T_{H_0}$ represents two-way travel time of seismic data corresponding to depth of an acoustic logging marker bed; $Ti_{between}$ represents an acoustic time difference; $\Delta H$ represents a sampling interval for logging curve data; and $T_d$ represents the two-way travel time of seismic waves;

step S500, performing interpolation based on the actual drilling time-depth relationship of the current batch, to acquire interpolated actual drilling time-depth relationship $[[T'_1, D'_1][T'_2, D'_2] \ldots [T'_w, D'_w]]$ of the current batch;

step S600, correcting the interpolated actual drilling time-depth relationship $[[T'_1, D'_1][T'_2, D'_2] \ldots [T'_w, D'_w]]$ of the current batch, to acquire a corrected actual drilling acoustic curve of the current batch; and step S700, completing accurate depth correction of the current batch based on the actual drilling acoustic curve of the current batch, returning to step S100, and determining accurate depth while drilling based on acoustic curve data while drilling of a next batch, wherein the stratum boundaries are identified and the drilling is optimizing at different depths based on the corrected actual drilling acoustic curve and the determined accurate depth.

2. The real-time calibration method of acoustic logging data while drilling for precise navigation of deep oil and gas according to claim 1, wherein processing the outliers is performed by an isolation forest method:

step S110, using the acoustic curve data while drilling as a dataset X to be processed;

step S120, randomly extracting $\varphi$ data points from the dataset X to be processed to form a data subset X' to be processed, and storing the data subset to be processed in a root node;

step S130, randomly selecting a dimension q from the dataset X to be processed, and randomly generating a split point p in the dimension q, wherein the split point p satisfies $\min(x_{ij}, j=q, x_{ij} \in X') < p < \max(x_{ij}, j=q, x_{ij} \in X')$;

step S140, generating, based on a split point p, a hyperplane that divides data in the dimension q into two subspaces, and placing data points with values smaller than p in the dimension q into the first leaf node, and data points with values greater than or equal to p into the second leaf node;

step S150, performing recursion on the methods described in steps S130 to S140 until all the leaf nodes have only one data point or isolation trees have reached a preset height;

step S160, repeating the methods described in steps S130 to S150 until T isolation trees are generated, where the T isolation trees represent: the isolation trees have no external node of a leaf node, or have two leaf nodes $\{T_l, T_r\}$ and one internal node test; the internal node test of the T isolation trees consists of the dimension q and a split point p, the points with $q<p$ belong to $T_l$, and otherwise, the points belong to $T_r$;

step S170, calling the T isolation trees as an isolation tree forest, letting each data point $x_i$ traverse through each isolation tree, and calculating heights $h(x_i)$ of the data points $x_i$ in each isolation tree, namely the number of edges that the data points $x_i$ pass through from the root node to the leaf nodes of the isolation tree wherein the data points locate; and thus, calculating an average height of the data points $X_i$ a in the isolation tree forest, and normalizing the average heights of all the data points to acquire a normalized average height $\overline{h(x_i)}$ of the data points; and step S180, calculating an outlier score $s(x_i, \varphi)$ based on the normalized average height $\overline{h(x_i)}$ of the data points:

$$s(x_i, \varphi) = 2^{-\frac{E(\overline{h(x_i)})}{c(\varphi)}},$$

wherein
$\overline{c(\varphi)}$ represents an average value of binary tree path lengths constructed by $\varphi$ data points, and $E(*)$ represents an expectation;

$$\overline{c(\varphi)} = \begin{cases} 2H(\varphi-1) - \frac{2(\varphi-1)}{\varphi}, & \varphi > 2 \\ 1, & \varphi = 2 \\ 0, & \varphi < 2 \end{cases},$$

Wherein
$H(\mu)$ represents a harmonic number, and is estimated through $\ln(\mu)+0.5772156649$, and $0.5772156649$ is Euler's constant; and when the outlier score $S(x_i, \varphi)$ is less than a preset outlier threshold S, removing the corresponding data points to acquire the acoustic curve data $C=\{c_1, \ldots, c_\alpha, \ldots, c_m\}$, $1 \leq \alpha \leq m$, and $c_\alpha \in C$ without outliers, wherein m represents the number of the data points in the seismic data without outliers.

3. The real-time calibration method of acoustic logging data while drilling for precise navigation of deep oil and gas according to claim 2, wherein step S200 specifically comprises:

step S210, calculating a mean estimated value $AC_{mean}$ and a variance estimated value $AC_{var}$ of the acoustic curve data without outliers of the current batch:

$$AC_{mean} = \frac{\sum_{i_{sample}=1}^{i_{sample}=card(batch)} AC_{sample}}{card(batch)},$$

$$AC_{var} = \sqrt{\frac{1}{card(batch)} \sum_{j_{sample}=1}^{j_{sample}=card(batch)} (AC_{sample} - AC_{mean})};$$

Card(batch) represents the number of samples in a batch, $j_{sample}$ represents the serial number of counting operators, and $i_{sample}$ represents the serial number of the samples;

step S220, calculating a standard deviation $\sigma_s$ of historical AC curve data, and performing stretching and compression transformation on AC curve data without outliers of the current batch;

$$stretch_k = AC_{mean} + (AC_k - AC_{mean}) * \frac{\sigma_s}{AC_{var}},$$

wherein
$stretch_k$ represents the AC curve data acquired after stretching and compression transformation, and $AC_k$ represents an AC value of the $k^{th}$ sample point of the AC curve data without outliers of the current batch; and step S230, performing translation transformation on the AC curve data acquired after the stretching and compression transformation based on a mean standard value $\mu_s$ of the historical AC curve data:

$offset_y = stretch_k + (\mu_s - AC_{mean})$, wherein $offset_y$ represents the standardized acoustic parameter data while drilling acquired after the translation transformation.

4. The real-time calibration method of acoustic logging data while drilling for precise navigation of deep oil and gas according to claim 1, wherein step S500 specifically comprises:

performing spline interpolation on the actual drilling time-depth relationship $[[T_1, D_1][T_2, D_2] \ldots [T_x, D_x]]$ of the current batch and the time-depth relationship $[[TT_1, DD_1], [TT_2, DD_2] \ldots [TT_y, DD_y]]$ of the historical acoustic curve data of the drilled wells according to time, to acquire interpolated actual drilling time-depth relationship $[[T'_1, D'_1][T'_2, D'_2] \ldots [T'_w, D'_w]]$ of the current batch and the interpolated time-depth relationship $[TT'_1, DD'_1][TT'_2, DD'_2] \ldots [TT'_w, DD'_w]]$ of the historical acoustic curve data of the drilled wells that are consistent, wherein $[T'_1, T'_2, \ldots T'_w]$ and $[TT'_1, TT'_2, \ldots TT'_w]$ are consistent.

5. The real-time calibration method of acoustic logging data while drilling for precise navigation of deep oil and gas according to claim 1, wherein step S600 specifically comprises:

step S610, correcting a depth value in the actual drilling time-depth relationship $[[T_1, D_1][T_2, D_2] \ldots [T_x, D_x]]$ of the current batch based on the time-depth relationship $[TT_1, DD_1], [TT_2, DD_2] \ldots [TT_y, DD_y]]$ of the historical acoustic curve data of the drilled wells, to acquire corrected actual drilling time-depth relationship of the current batch; and step S620, querying acoustic time difference data $[D_1, AC_1][D_2, AC_2] \ldots [D_x, AC_x]]$ based on the corrected depth value in the actual drilling time-depth relationship of the current batch, to acquire accurate acoustic curve data of the current batch.

6. A real-time calibration system of acoustic logging data while drilling, to identify stratum boundaries and optimizing drilling at different depths for precise navigation of deep oil and gas, comprising:

a data acquisition and outlier processing module, configured to acquire acoustic curve data while drilling in real time, process outliers to acquire acoustic curve data without outliers, wherein the acoustic curve data while drilling is acquired in a batch form, and acquire historical acoustic curve data of drilled wells;

a data standardization module, configured to perform stretching and translation transformation on the acoustic curve data without outliers of a current batch according to the historical acoustic curve data, to acquire standardized acoustic parameter data while drilling;

a rationality judgment module, configured to judge rationality of the standardized acoustic parameter data while drilling and the historical acoustic curve data, to acquire a rationality judgment result, if the rationality judgment result is accepted, proceed to a well-to-seismic calibration module, and if the rationality judgment result is not accepted, proceed to the data acquisition and outlier processing module, adjust determination conditions for processing the outliers, and re-judge the rationality, comprising:

calculating a probability distribution curve $L_1$ of the transformed AC parameter data while drilling and a probability distribution curve $L_2$ of AC parameter data of the drilled wells, separately;

calculating a probability distribution curve area intersection $U_1$ and a probability distribution curve area union $U_2$ based on $L_1$ and $L_2$;

calculating a quality control parameter $U=U_1/U_2$ based on $U_1$ and $U_2$;

comparing a size of the quality control parameter U with that of a set quality control threshold;

when the quality control parameter U is greater than or equal to the set quality control threshold, determining that the rationality judgment result is accepted, and proceeding to the well-to-seismic calibration module; and when the quality control parameter U is less than the set quality control threshold, determining that the rationality judgment result is not accepted, proceeding to the data acquisition and outlier processing module, and adjusting an outlier threshold S;

the well-to-seismic calibration module, configured to perform well-to-seismic calibration based on the historical acoustic curve data of the drilled wells, to acquire time-depth relationship $[TT_1, DD_1][TT_2, DD_2] \ldots [TT_y, DD_y]]$ of the historical acoustic curve data of the drilled wells; and well-to-seismic calibration is performed based on the standardized acoustic parameter data while drilling of the current batch, to acquire actual drilling time-depth relationship $[[T_1, D_1][T_2, D_2] \ldots [T_x, D_x]]$ of the current batch;

a method for well-to-seismic calibration comprises:

acquiring a wave impedance curve by multiplying an acoustic time difference curve by a density curve in logging data of each known well location, and then calculating a reflection coefficient curve;

constructing a ricker wavelet based on dominant frequency of seism in a target interval, and performing convolution computation on the ricker wavelet and the reflection coefficient curve to acquire a synthetic seismogram; and enabling depth data of a marker bed at a borehole of each drilling well location to correspond to isochronous three-dimensional distribution of the marker bed, calculating correlation between the synthetic seismogram and the spread spectrum simulated wavelet of a near-well seismic trace, when waveform correlation is higher than a preset relevant threshold, completing the well-to-seismic calibration, and acquiring time-depth conversion relationship between logging depth and two-way travel time of seismic reflection waves:

$$T_d = T_{H_0} + 2 \sum_{i_{between}=1}^{Z_{between}} Ti_{between} \cdot \Delta H;$$

wherein $T_{H_0}$ represents two-way travel time of seismic data corresponding to depth of an acoustic logging marker bed; $Ti_{between}$ represents an acoustic time difference; $\Delta H$ represents a sampling interval for logging curve data; and $T_d$ represents the two-way travel time of seismic waves;

an interpolation module, configured to perform interpolation based on the actual drilling time-depth relationship of the current batch, to acquire interpolated actual drilling time-depth relationship $[[T'_1, D'_1][T'_2, D'_2] \ldots [T'_w, D'_w]]$ of the current batch;

a time-depth relationship correcting module, configured to correct the time-depth relationship $[[TT_1, DD_1], [TT_2, DD_2] \ldots [TT_y, DD_y]]$ of the historical acoustic curve data of the drilled wells based on the interpolated actual drilling time-depth relationship $[[T'_1, D'_1][T'_2, D'_2] \ldots [T'_w, D'_w]]$ of the current batch, to acquire a corrected actual drilling acoustic curve of the current batch; and a precise depth calculation module, configured to complete precise depth correction of the current batch based on the actual drilling acoustic curve of the current batch, return to the data acquisition and outlier processing module, and determine the precise depth while drilling based on the acoustic curve data while drilling of a next batch, wherein the stratum boundaries are identified and the drilling is optimizing at different depths based on the corrected actual drilling acoustic curve and the determined precise depth.

* * * * *